United States Patent [19]

Lord

[11] Patent Number: 4,528,733

[45] Date of Patent: Jul. 16, 1985

[54] METHOD OF MAKING TUBULAR HEAT EXCHANGERS

[75] Inventor: Thomas J. Lord, Dayton, Ohio

[73] Assignee: United Aircraft Products, Inc., Dayton, Ohio

[21] Appl. No.: 516,673

[22] Filed: Jul. 25, 1983

[51] Int. Cl.³ .................... B21D 53/08; B21D 39/02; B23P 15/26

[52] U.S. Cl. .................... 29/157.3 C; 29/157.4; 29/447; 29/DIG. 25; 165/175; 165/177; 165/DIG. 8; 285/381; 403/273; 403/404

[58] Field of Search ............... 29/DIG. 25, 157.3 C, 29/445, 446, 447, 157.4; 165/128, 175, 177, DIG. 8; 285/381; 403/263, 273, 404

[56] References Cited

U.S. PATENT DOCUMENTS

| | | | |
|---|---|---|---|
| 2,021,856 | 11/1935 | Forbes | 165/175 |
| 3,513,429 | 5/1970 | Helsop | 29/447 X |
| 3,872,573 | 3/1975 | Nichols et al. | 29/447 |
| 3,922,768 | 12/1975 | Takayasu | 29/157.4 X |
| 3,962,766 | 6/1976 | Pompidor et al. | 29/447 X |
| 4,149,911 | 4/1979 | Clabburn | 29/446 |
| 4,198,081 | 4/1980 | Harrison et al. | 29/447 X |
| 4,226,448 | 10/1980 | Broyles | 285/381 |
| 4,258,939 | 3/1981 | Karlen | 285/381 X |
| 4,297,779 | 11/1981 | Melton et al. | 403/273 X |

Primary Examiner—Howard N. Goldberg
Assistant Examiner—Ronald S. Wallace
Attorney, Agent, or Firm—J. E. Beringer

[57] ABSTRACT

A method of mechanically joining tubes to headers in tubular heat exchangers of a high density, high performance type. The headers are made of a heat recoverable metallic material and worked while in a martensitic state to be subsequently shrunk upon installed tubes. Procedural steps are carried out with particular regard to a header construction characterized by a multiplicity of closely spaced apart tube accommodating holes separated by relatively narrow ligaments in which working stresses are to be absorbed.

12 Claims, 11 Drawing Figures

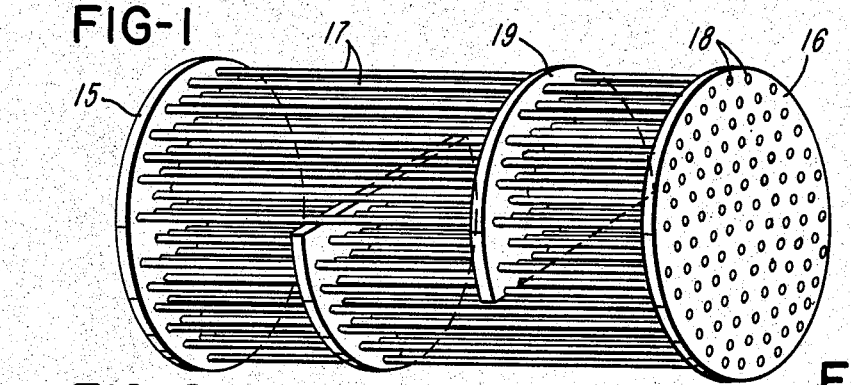
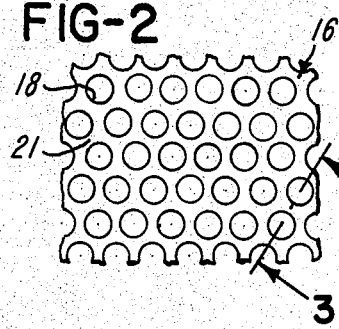
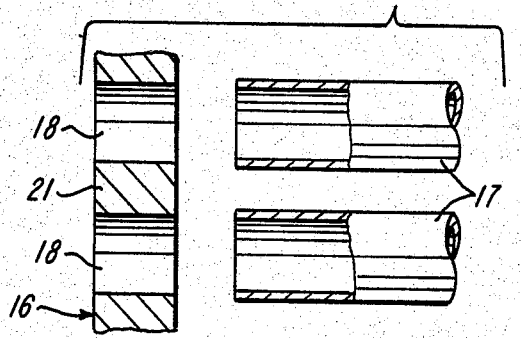
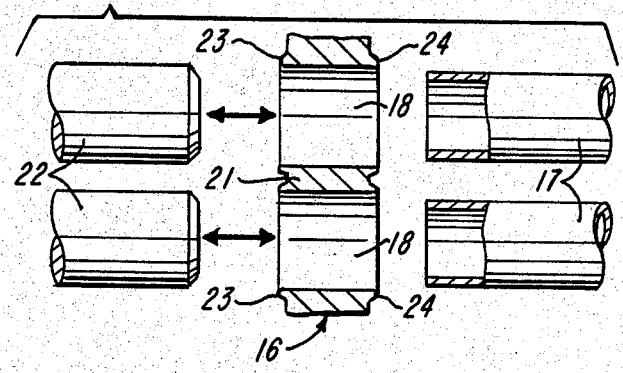
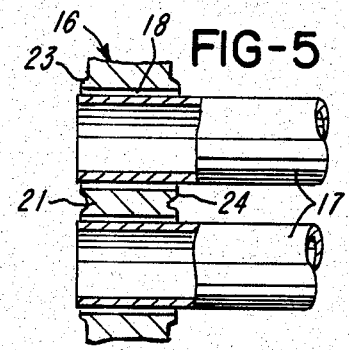
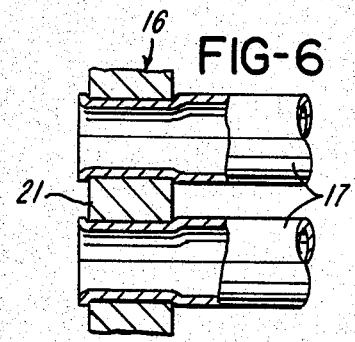
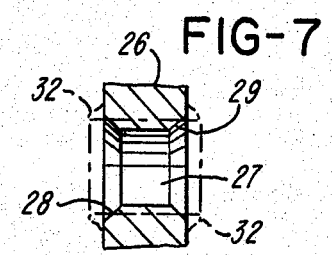

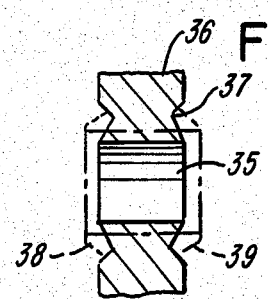
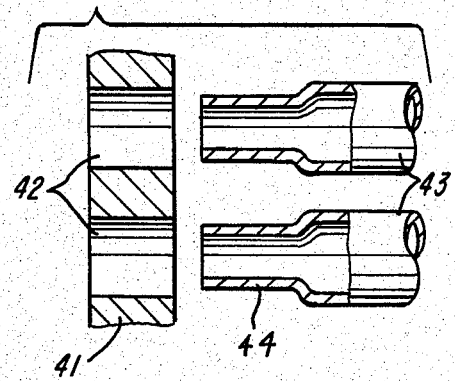
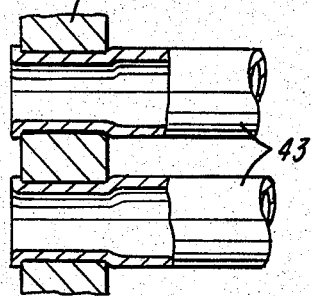

METHOD OF MAKING TUBULAR HEAT EXCHANGERS

BACKGROUND OF THE INVENTION

1. Field of the Invention

This invention relates to methods of making tubular heat exchangers, and particularly to a relatively simple and effective means for mechanically joining tubes to headers, expecially in heat exchangers of a high density, high performance type.

2. Description of the Prior Art

Heat exchangers in which many tubes are assembled in a densely packed relation find frequent use, especially in aircraft, where their compact construction and intensified heat transfer capabilities offer important advantages. The making of such heat exchangers poses certain problems, as in the mounting of tubes to supporting headers and in the sealing of the multitude of tube to header joints. In a typical example, a compact tubular heat exchanger consists of some 600 tubes mounted between headers six inches or less in diameter. Tubes have a diameter on the order of one-eighth inch and a wall thickness of 0.010 to 0.005. Tube accommodating holes in the header have diameters relatively closely to receive inserted tubes and are separated by ligaments of solid header material made as narrow as possible consistent with expected stresses and structural integrity. The tubes must be joined to the headers by means accomplishing both a seal and a bond.

Historically, the joining of tubes to headers, in a tubular heat exchanger, is done by swaging and rolling techniques. These are generally inapplicable to compact heat exchangers due to the small interior size of the tube and the likelihood of damage to the relatively thin tube and permanent stress that may be induced in relatively narrow header ligaments. Accordingly, the joining process commonly used is one of brazing. In a representative brazing process, a braze alloy in a slurry, foil or like form is introduced into each tube to header joint and a complete assembly comprising headers and mounted tubes is placed in a special furnace. There, in an inert atmosphere and under controlled conditions, the temperature of the assembly is raised to a determined value and then lowered. The braze alloy melts, flows to fill the joint in which it is contained, and then hardens.

As a joining technique, brazing has many advantages and is popularly and successfully used. It has some disadvantages, however, as in the difficulty of repair procedures with respect to individual joints. Also, under severe service conditions, fractures may occur at less strongly brazed joints, allowing leakage. These disadvantages become in some instances major considerations, leading in those instances to a demand for mechanically installed tubes. In meeting this demand, a prior art process has been developed in which hollow rivets or ferrules are inserted in tube ends and then expanded, using a special tool and axial motion. See U.S. Pat. No. 4,152,818, issued May 8, 1979. The prior art process achieves its desired ends. It is, however, a rather expensive procedure, and, since it places rivet-like devices in the flow path through the tubes, raises the pressure drop in the fluid flowing through the tubes. For some heat exchanger applications permitted pressure drop in the tube side fluid is a critical design consideration.

SUMMARY OF THE INVENTION

The present invention relates to mechanical tube installation, dealing substantially with the same problems as does the invention of U.S. Pat. No. 4,152,818. The instant invention, however, has one of the same advantages as brazing in that all joints across the face of the heat exchanger are sealed simultaneously. Also, there is no need for inserted rivets and therefore, no obstruction to a free flow of fluid through the tubes. Still further, the invention simplifies the tube loading process, that is, the process by which tubes are inserted into header plate holes preparatory to the joining process.

In achieving these ends, the invention perceives an applicability of a heat recoverable metallic material known as "Nitinol", and conceives of process steps by which that material may be used in a solution of mechanical tube installation problems. In one disclosed embodiment, headers are made of a heat recoverable material and in another embodiment tubes are so made. Both embodiments have certain advantages in simplified tube installation. Both, moreover, either inadvertently or by reason of conceived process steps, obviate a transmission of stresses in header ligaments that may distort adjacent holes. Referring, for example, to an embodiment in which the header is made of a heat recoverable material, the header is drilled with a multiplicity of closely spaced apart holes. The diameter of each hole is somewhat less than the diameter of the tube to be installed therein. At a lowered temperature, producing martensitic conditions, each hole is enlarged by means and in a manner displacing material longitudinally of the hole leaving only minor stresses to be absorbed into header ligaments. Tubes are installed, the insertion of tube ends into accommodating holes being made easier by hole enlargement. The temperature of the header then is raised to and through a transition temperature value, achieving austenitic conditions. In the course of this change of phase, deformed hole portions revert to their pre-enlarged or originally drilled configuration and in the process close upon an accommodated tube. The tube is tightly gripped and held by reason of its thin walled construction may be indented by the closing hole wall. The operation forms a seal and a bond at the tube to header joint. Moreover, all such tube to header joints over the face of the header are sealed in a single operation as the header passes from a martensitic state to an austenitic state. Still further, opposing spaced apart headers, and intermediate baffle members, if any, may be made of the heat recoverable material, assembled with the tubes and brought at the same time to the asutenitic state. The parts of a complete core of a tubular heat exchanger may, in this manner, be joined together in a single operation.

An object of the invention is to provide a method of making a tubular heat exchanger, substantially as set out in the foregoing.

Other objects and details of the method steps will more clearly appear from the following description when read in connection with the accompanying drawings, wherein:

FIG. 1 is a view in perspective, and partly diagrammatic, of the assembled core of a tubular heat exchanger.

FIG. 2 is a fragmentary, enlarged view in front or end elevation of a drilled header plate;

FIG. 3 is a fragmentary view in cross section of a header showing a typical hole therein drilled to accommodate insertion of a tube, the header being shown prior to hole enlargement.

FIG. 4 is a view like FIG. 3, showing enlargement of the drilled hole, the header being in a martensitic state;

FIG. 5 is a view like FIG. 4, showing a tube inserted in the enlarged hole;

FIG. 6 is a view like FIG. 5, showing the parts after transition to an austenitic stage with the tube fixed to and sealed within the header;

FIG. 7 is a view like FIGS. 3, 4, showing an alternate hole configuration;

FIG. 8 is a view like FIG. 7, showing another header and hole configuration;

FIG. 9 is a view like FIG. 7 and 8, showing still another header and hole configuration;

FIG. 10 is a view like FIGS. 5–6, showing another form of the invention in which the tube rather than the header is made of a heat recoverable material, the parts being shown with the tube deformed and about to be inserted in the header; and FIG. 11 is a view like FIG. 10, showing the tube expanded into sealed relation to the header.

Referring to the drawings, the core of a compact, high density tubular heat exchanger includes a pair of longitudinally spaced apart plate headers 15 and 16 interconnected by tubes 17. The headers have through holes 18 receiving respective opposite ends of the tubes. The core assembly may further include segmental baffles 19, perforated for passage of the tubes there through and occupying longitudinally spaced apart locations between the headers. The baffles assist in holding the tubes against vibrating and like motion and, in addition, direct a flowing fluid to move from adjacent one header to the other in a series of transverse passes across what may be termed the tube bundle. As will be understood, the core is commonly mounted in an enclosing shell and functions to effect a transfer of heat between a first or tube side fluid flowing through the tubes and a second or shell side fluid flowing over and around the tubes.

The holes 18 are closely spaced apart in accordance with the concept of achieving a dense tube bundle. The header between the holes forms solid lands 21 termed ligaments as they are in an interconnecting relation to one another and to peripheral header portions. The holes appear in rows and adjacent rows are offset, thus providing a staggered hole pattern useful in achieving greater tube density and ligaments of substantially uniform width. A consideration in the design of compact tubular heat exchangers is to provide a hole pattern in the headers of minimal spacing consistent with available drilling practices and with the preservation of adequate security in the ties as represented by the ligaments 21. The headers are made as rigid, plate-like members having flat, planar front and back faces. They have a uniform thickness which, at least in one instance, exceeds the width of ligaments 21.

In accordance with a first considered form of the invention, the headers 15 and 16, and the baffle segments 19 as well if desired, are made of a heat recoverable material, that is, a memory material having the characteristic of reverting from a deformed configuration to an original configuration in passing from a martensitic phase to an austenitic phase. One such material exhibiting this characteristic is that known as "Nitinol", an alloy of nickel and titanium with which cobalt or another material may be combined to select a transition temperature. In the description and claims to follow, references to a heat recoverable material identify "Nitinol" or a functionally equivalent material.

An assembly procedure is described with reference to a single header and for the most part with respect to a single tube to header joint. It will be understood, however, that both headers are prepared in the same fashion and that tubes are loaded into both headers as a part of the same process, either by hand or by machine. The holes 18 are conventionally formed by drilling, a process producing smooth hole walls, and consistently uniform diameters.

Drilling is carried out at normal or room temperature, leaving the header substantially as shown in FIG. 2 and 3. Holes 18 are drilled to a uniform diameter, which diameter is, as indicated, somewhat less than the diameter of tubes 17 to be installed therein.

Assuming the header to have been properly conditioned for subsequent steps, it is subjected to rapid cooling to a very low temperature, as for example −80° F. While held at or about this temperature, individual holes 18 are enlarged to a diameter somewhat greater than the tube diameters. As indicated in FIG. 4, this is done using a swage 22 or like tool in a manual or machine operation. In either event, the swage or other enlarging tool is applied in a manner to displace material of the hole wall in a generally axial rather than a radial sense. As a result, bulbous formations 23 and 24 project from front and back faces of the plate around each hole 18, such formation being comprised of material displaced from the hole wall. Further, in displacing material in a sense axially rather than radially, stresses which may be applied toward adjacent holes and in opposition to stresses applied from such adjacent holes are avoided or minimized. Relatively narrow ligaments 21 are not required to absorb such stresses, nor are they distorted with consequent distortion of adjacent holes. The relative ductility of the header material, in the martensitic state, facilitates metal displacement. Such displacement, while shown as occurring at both ends of the hole may be confined to only one end, depending on the enlarging tool or method used.

The enlarged hole 18 provides ready access thereto of tube 17, the position of an inserted tube end in an enlarged hole being indicated in FIG. 5. All tubes are assembled to spaced apart headers, and to baffles 19 if used, substantially as shown. If required, parts are held in an assembled relation by known temporarily effective means. Then the assembly is heated or allowed to rise toward room or operating temperatures. In the course of such temperature rise, parts made of the heat recoverable material pass through a transition temperature or range of temperatures in which the metal thereof changes state from martensitic to austenitic. As this occurs, the heat recoverable parts return or attempt to return to the configuration they had before being deformed while in the martensitic state. Specifically, bulbous formations 23 and 24 retract into respective holes 18, with the holes themselves reverting from the FIG. 4 configuration to the FIG. 3 configuration. Since this is done in the presence of installed tubes 17, the hole walls close upon the respective installed tubes, and, as indicated in FIG. 6, may indent the relatively thin tube wall. The result is positively to fix the tubes to the headers and at each tube to header joint to create a seal and a bond. All such joints are closed simultaneously as the headers pass through the transition temperature. The joints will remain tightly closed and sealed throughout the operating life of the heat exchanger, it being understood, however, that such operating life should not be at temperatures at or below the transition temperature.

In FIG. 7 a modified form of header 26 is shown having tube accommodating holes 27. In this instance, however, the material around each hole 27 is reduced, at each end of the hole, by a countersinking or like process forming recesses 28 and 29. This leaves a localized land area in the hole wall for gripping the tube and facilitates the deforming process by which protrusions 32 are formed in the martensitic state.

In FIG. 8, a header 33 has the character of a deformable tube sheet. Tube accommodating holes 34 are formed in a perforating or like operation deflecting an annulus around the hole into a circular lip 35. In the deforming step, performed in the martensitic state, the lip 35 is additionally deflected as to a position shown in broken lines. Returning from such further deflected position, as the header is raised in temperature to and above the transition value, lip 35 grips and seals to an installed tube substantially in the manner shown in FIG. 6.

The header modification shown in FIG. 9 is similar to that of FIG. 7. Here, however, an annular area adjacent to each hole 35, in a header 36, is undercut in each header face to form a V-shaped recess 37. The header portion immediately around the hole is thus readily deformed into protrusions 38 and 39, with these reverting in the austenitic state to a tube gripping configuration.

FIGS. 10 and 11 illustrate procedural steps in an embodiment in which the tubes rather than the headers are the heat recoverable members. In this instance a header 41 has tube accommodating holes 42 of a diameter somewhat less than the diameter of tubes 43 to be received therein. The tubes can be expected, therefore, to have an interference fit as installed in the header. The header is made of a material appropriate to the uses of the heat exchanger, for example a stainless steel. The tubes are made of a heat recoverable material having properties like or the same as that considered in FIGS. 1-9 embodiments. In the assembly process, the tubes for installation are reduced to a very low temperature, or on the order of $-80°$ F. At that temperature, ends of the tubes are squeezed down to form reduced diameter tips 44. As indicated in FIG. 10, a tip 44 is sized readily to be inserted in a hole 42. The tubes are assembled to the headers, and, as in the case of previously considered embodiments, the assembly is heated or allowed to rise in temperature to and above the transition temperature at which the tube material becomes austenitic. As this occurs, the deformed tips 44 expand or attempt to expand to their original configuration. In the process, they engage the walls of holes 42 and are tightly gripped thereby. A fully installed tube, sealed and bonded to the header, may have a configuration and a relationship to the header substantially as shown in FIG. 11.

A limited number of embodiments of the invention are disclosed herein. It will be understood that these, and others that may obviously suggest themselves to those skilled in the art having the present disclosure before them, are comprehended by the invention.

What is claimed is:

1. A method of assembling multiple tubes to longitudinally spaced apart headers to form the core of a tubular heat exchanger, including the steps of:
   (a) providing multiple tubes and headers to mount said tubes, at least one of said headers being made as a plate-like part out of a heat recoverable metal and having front and back external faces;
   (b) drilling a multiplicity of closely spaced apart through holes in said one header each to a diameter somewhat less than the outside diameter of a tube to be installed therein, the drilled holes being separated by relatively narrow ligaments of solid plate material;
   (c) lowering the temperature of said header and at a temperature below a determined transition temperature subjecting the hole walls to a deforming pressure enlarging said holes each to a diameter somewhat greater than the outside diameter of a tube to be installed therein, said deforming pressures being applied individually to said holes to displace deformed material in a longitudinal sense of said header without appreciable transference of stress into said ligaments toward the walls of adjacent holes;
   (d) assembling the heat exchanger core including the step of installing tube ends in respective enlarged holes in said one header, tube end portions extending substantially through said holes; and
   (e) raising the temperature of said header to and above said transition temperature whereupon deformed material of said header at each hole location returns or attempts to return to its original configuration independently of and simultaneously with deformed material at other hole locations and in the process grips a respective tube forming a seal and a bond therewith.

2. A method according to claim 1, said tubes having a thin-wall metal construction and fitting sufficiently closely into respective enlarged holes to be indented by deformed hole wall portions as they return to their original configurations.

3. A method according to claim 1, said holes being enlarged by a swaging-like process utilizing a tool physically to displace material defining the hole wall forwardly and rearwardly to project from front and back header faces.

4. A method according to claim 1, said header being a flat metal part the front and back face of which are planar and in a parallel relation, said part having a thickness exceeding the maximum width of said ligaments.

5. A method according to claim 4, wherein the holes in said header are drilled in vertically spaced apart transverse rows, corresponding holes in adjoining rows being offset from one another, the spacing between adjacent rows being uniform over the face of the header and the spacing between holes of each row being uniform, whereby holes over the face of the header are substantially uniformly spaced from one another and define separating ligaments of substantially uniform width and configuration.

6. A method according to claim 3, said header being a flat plate-like member having front and back planar faces, said holes each having a uniform diameter from face to face of the header.

7. A method according to claim 6, an annular header portion in an adjacent surrounding relation to each hole and in each header face being cut away to an approximately V-shape.

8. A method according to claim 3, said header being a flat plate-like member having front and back planar faces, opposite header faces at each hole location being countersunk to produce a hole wall portion of reduced length terminating at each face in a recess.

9. A method of assembling multiple tubes to longitudinally spaced apart headers to form the core of a tubular heat exchanger, including the steps of:

(a) providing a tube element and a header element to mount the tube, one thereof being made of a heat recoverable material, the header having a hole to receive the tube and the hole and tube being dimensioned for an interference fit;

(b) lowering the temperature of the element made of heat recoverable material and at a temperature below a determined transition temperature subjecting said element to a deforming pressure whereby the tube may be inserted in the header hole with a non-interference fit.

(c) Inserting the tube in said header; and (d) raising the temperature of the deformed element to and above a transition temperature at which it reverts to its original pre-deformed configuration and accomplishes an interference fit of the tube in its accommodating hole.

10. A method according to claim 9, the element made of a heat recoverable material being said header, the deforming pressure being applied in an enlarging of the diameter of the hole therein.

11. A method according to claim 9, the element made of a heat recoverable material being said tube, the deforming pressure being applied in a reducing of the diameter of the tube at a location to be accommodated in the header hole.

12. A method according to claim 10, the header having a multiplicity of holes separated by relatively narrow ligaments, there being a tube for each hole and the bringing of the header to and above the transition temperature resulting in a simultaneous reduction in diameter of all header holes for a simultaneous closing of the multiplicity of tube to header joints.

* * * * *